(12) United States Patent
Tian

(10) Patent No.: US 10,081,423 B2
(45) Date of Patent: Sep. 25, 2018

(54) ROTOR DRIVING SYSTEM

(71) Applicant: Shenzhen United Aircraft Technology Co., Ltd., Shenzhen (CN)

(72) Inventor: Gangyin Tian, Beijing (CN)

(73) Assignee: Shenzhen United Aircraft Technology Co., Ltd., Shenzhen (CN)

( * ) Notice: Subject to any disclaimer, the term of this patent is extended or adjusted under 35 U.S.C. 154(b) by 347 days.

(21) Appl. No.: 15/031,467

(22) PCT Filed: Oct. 23, 2013

(86) PCT No.: PCT/CN2013/085745
§ 371 (c)(1),
(2) Date: Apr. 22, 2016

(87) PCT Pub. No.: WO2015/058364
PCT Pub. Date: Apr. 30, 2015

(65) Prior Publication Data
US 2016/0264238 A1 Sep. 15, 2016

(51) Int. Cl.
*B64C 27/605* (2006.01)
*B64C 27/10* (2006.01)
*B64C 27/12* (2006.01)

(52) U.S. Cl.
CPC ............ *B64C 27/605* (2013.01); *B64C 27/10* (2013.01); *B64C 27/12* (2013.01)

(58) Field of Classification Search
CPC ......... B64C 27/04; B64C 27/08; B64C 27/10; B64C 27/12; B64C 27/605
See application file for complete search history.

(56) References Cited

FOREIGN PATENT DOCUMENTS

CN    102658865 A    9/2012
CN    103318407 A    9/2013
(Continued)

OTHER PUBLICATIONS

Machine Translation of CN103318407.*
International Search Report and Written Opinion dated Jul. 9, 2014 for Application No. PCT/CN2013/085745.

*Primary Examiner* — Logan Kraft
*Assistant Examiner* — Elton Wong
(74) *Attorney, Agent, or Firm* — Wolf, Greenfield & Sacks, P.C.

(57) ABSTRACT

The embodiments of the present invention disclose a rotor driving system, wherein at least three first actuators can drive a nonrotating lower-rotor swashplate to tilt towards a specific direction by cooperating with each other such that a rotating lower-rotor swashplate, lower tilted-arm pull rods and blade-clamp tilted arms of the lower rotor are all in motion, thereby driving first blade clamping bodies to be twisted relative to a lower rotor hub; at least three second actuators can drive a nonrotating upper-rotor swashplate towards a specific direction by cooperating with each other such that a rotating upper-rotor swashplate, upper-rotor steering rod—L arms, lower upper-rotor steering rods, pull rods, upper upper-rotor steering rods, upper tilted-arm pull rods, blade-clamp tilted arms 42 of the upper rotor are all in motion, thereby driving a second blade clamping body to be twisted relative to an upper rotor hub. Thus, in the solution, the structure of a rotor driving system is simplified, thus solving the problems of a low production efficiency of the process and of inconvenient testing and maintenance.

14 Claims, 7 Drawing Sheets

(56) References Cited

FOREIGN PATENT DOCUMENTS

EP        1 944 234 A1    7/2008
RU      2 155 702 C1    9/2000

\* cited by examiner

ROTOR DRIVING SYSTEM

CROSS REFERENCE TO RELATED APPLICATIONS

This application is the National Phase under 35 U.S.C. § 371 of PCT International Application No. PCT/CN2013/085745, filed Oct. 23, 2013, the entire contents of the aforementioned application is hereby incorporated herein by reference.

TECHNICAL FIELD

The present invention relates to the field of a twin-rotor coaxial autonomous helicopter, and particularly relates to a rotor driving system.

BACKGROUND

The so-called twin-rotor coaxial autonomous helicopter may include an upper rotor and a lower rotor with a same structure, a main shaft constituted by an inner shaft and an outer shaft that rotates reversely relative to the inner shaft, wherein, the upper rotor is mounted at one end of the inner shaft and the lower rotor is mounted at one end of the outer shaft, and the upper rotor is spaced by a certain distance with the lower rotor; wherein, the upper rotor rotates with the inner shaft and the lower rotor rotates with the outer shaft such that the lower rotor can rotate reversely relative to the upper rotor, and thus the torques generated by the upper and lower rotors can keep balance with each other in a flight state in which the course is unchanged without installation of a tail rotor and a tail beam, and the manipulation of course can be realized by the unbalanced torques generated by the differential of collective pitch of the upper and lower rotors.

In the prior art, the structure of a rotor driving system enabling course manipulation in a twin-rotor coaxial autonomous helicopter is complex, which leads to a low production efficiency of the process and inconvenient testing and maintenance.

SUMMARY

Based on the problems described above, embodiments of the present invention disclose a rotor driving system so as to simplify the structure of the rotor driving system and thus to solve the problems of inconvenient testing and maintenance. The technical solutions are presented as follows.

An embodiment of the present invention provides a rotor driving system that is applicable to a twin-rotor coaxial autonomous helicopter, wherein the twin-rotor coaxial autonomous helicopter comprises:

an outer shaft 19;
a lower rotor hub 14 fixed at outside of one end of the outer shaft 19;
at least two first blade clamping bodies that are connected with the lower rotor hub 14, each of the first blade clamping bodies can be twisted relative to the lower rotor hub 14 and comprises a first blade clamp 20 and a second blade clamp 22, wherein, the first blade clamp 20 and the second blade clamp 22 cooperatively clamp the lower rotor blade;
an inner shaft 15;
an upper rotor hub 16 fixed at outside of one end of the inner shaft 15;
at least two second blade clamping bodies that are connected with the upper rotor hub 16, each of the second blade clamping bodies can be twisted relative to the upper rotor hub 16 and comprises a third blade clamp 17 and a forth blade clamp 18, wherein, the third blade clamp 17 and the forth blade clamp 18 cooperatively clamp the upper rotor blade;
a box, in which a gear train is housed, comprising an upper cover 26, a box body 27 and a lower cover 1, wherein, the gear train is connected with the outer shaft 19 and the inner shaft 15;
a synchronous belt wheel 7 that is connected with the gear train, and rotation of the synchronous belt wheel 7 drives the gear train to rotate so as to drive the outer shaft 19 and the inner shaft 15 to rotate, and wherein the outer shaft (19) rotates reversely relative to the inner shaft (15), the lower rotor hub 14 is stationary relative to the outer shaft 19 and the upper rotor hub 16 is stationary relative to the inner shaft 15;

the rotor driving system comprises an upper-rotor driving system and a lower-rotor driving system;

wherein, the lower-rotor driving system may comprise:
at least two blade-clamp tilted arms 13 of the lower rotor, one end of each of which is fixed on a preset mounting surface of a corresponding first blade clamping body;
at least two lower tilted-arm pull rods 35, one end of each of which is connected with the other end of the corresponding blade-clamp tilted arm 13 of the lower rotor;
a supporting tower 10 which is sleeved on the outer shaft 19 with one end fixed on the upper cover 26;
the rotating lower-rotor swashplate 24 that is sleeved on a nonrotating lower-rotor swashplate 11 and is connected with the other end of each of the lower tilted-arm pull rods 35;
at least two lower-rotor steering assemblies, one end of each of which is connected with the lower rotor hub 14 and the other end is connected with the rotating lower-rotor swashplate 24 so as to drive the rotating lower-rotor swashplate 24 to rotate as the lower rotor hub 14 rotates with the outer shaft 19:
a nonrotating lower-rotor swashplate 11 that is sleeved on the supporting tower 10 via a lower-rotor joint bearing 57 and is connected with the rotating lower-rotor swashplate 24 via the lower-rotor joint bearing 57, and the rotating lower-rotor swashplate 24 and the nonrotating lower-rotor swashplate 11 can rotate independently from each other:
a actuator mounting base 2 that is fixedly connected with the lower cover 1:
at least three first actuators 8 mounted on the actuator mounting base 2, each of the first actuators 8 may comprise a housing; and a first screw-rod sleeve rod 65 with one end located in the housing, the first screw-rod sleeve rod 65 can be telescoped upward and downward, and the end of each first screw-rod sleeve rod 65 that protrudes out of the housing is connected with the nonrotating lower-rotor swashplate so as to drive the nonrotating lower-rotor swashplate 11 to tilt towards a specific direction as the first screw-rod sleeve rod 65 is telescoped upward and downward and thus drive the rotating lower-rotor swashplate (24) to tilt towards a specific direction;
at least three first motors 9, each of which is connected with a corresponding first actuator 8 and controls the first screw-rod sleeve rod 65 of the corresponding first actuator 8 to be telescoped upward and downward;
a first anti-rotation rod 25, one end of which is fixed on a location other than the location of the supporting tower 10 on the upper cover 26 and the other end is provided with a through hole;
a first sliding block 44 that is arranged on the nonrotating lower-rotor swashplate 11 and penetrates into the through hole of the first anti-rotation rod 25 so as to ensure that the nonrotating lower-rotor swashplate 11 can tilt towards a specific direction and is not rotatable with the rotating lower-rotor swashplate 24;

wherein, the upper-rotor driving system may comprise:

at least two blade-clamp tilted arms 42 of the upper rotor, one end of each of which is fixed on a preset mounting surface of a corresponding second blade clamping body;

at least two upper tilted-arm pull rods 41, one end of each of which is connected with the other end of the corresponding blade-clamp tilted arm 42 of the upper rotor;

at least two upper upper-rotor steering rods 40, one end of each of which is connected with the other end of the corresponding upper tilted-arm pull rod 41;

an upper pull-rod plug 39 that is connected with the other end of each of the upper upper-rotor steering rods 40;

at least two pull rods 56 located within the inner shaft 15, one end of each of which is connected with a corresponding upper upper-rotor steering rod 40 by the upper pull-rod plug 39;

a lower pull-rod plug 64;

at least two lower upper-rotor steering rods 45, one end of each of which is connected with the lower pull-rod plug 64 and is connected with the other end of the corresponding pull rod 56 by the lower pull-rod plug 56;

at least two upper-rotor steering rod—L arms 47, one end of each of the upper upper-rotor steering rod—L arms 47 is connected with the other end of the corresponding lower upper-rotor steering rod 45;

a sliding rod 46 of an upper-rotor swash plate;

a rotating upper-rotor swashplate 4 that is sleeved on the sliding rod 46 of the upper-rotor swash plate by an upper-rotor joint bearing 59 and is connected with the other end of the upper-rotor steering rod—L arm 47 such that the rotating upper-rotor swashplate 4 is driven to rotate under the action of the upper-rotor steering rod—L arms 47 and the lower upper-rotor steering rod 45 when the upper rotor hub 16 rotates with the inner shaft 15;

a nonrotating upper-rotor swashplate 3 that is sleeved on the rotating upper-rotor swashplate 4, and the rotating upper-rotor swashplate 4 and the nonrotating upper-rotor swashplate 3 can rotate independently from each other;

at least three second actuators 58 mounted on the upper cover 26, each of the second actuators 58 may comprise a housing; and a second screw-rod sleeve rod 28 with one end located in the housing, the second screw-rod sleeve rod 28 can be telescoped upward and downward, the end of each second screw-rod sleeve rod 28 that protrudes out of the housing is connected with the nonrotating upper-rotor swashplate 3 so as to drive the nonrotating upper-rotor swashplate 3 to tilt towards a specific direction as the second screw-rod sleeve rod 28 is telescoped upward and downward and thus drive the rotating upper-rotor swashplate 4 to tilt towards a specific direction;

at least three second motors 49 each of which is connected with a second screw-rod sleeve rod 28 of a corresponding second actuator 58 and controls the second screw-rod sleeve rod 28 of the corresponding second actuator 58 to be telescoped upward and downward;

a second anti-rotation rod 29 with one end fixed on the actuator mounting base 2 and the other end is provided with a through hole;

a second sliding block 30 which is arranged on the nonrotating upper-rotor swashplate 3 and penetrates into the through hole of the second anti-rotation rod 29 such that the nonrotating upper-rotor swashplate 3 can tilt towards a specific direction and is not rotatable with the rotating upper-rotor swashplate 4.

Preferably, the upper-rotor driving system comprises:

an upper inner-shaft head frame 37 that is connected with each of the upper upper-rotor steering rods 40 to support each of the upper upper-rotor steering rods 40 without affecting the rotation thereof, and one end of the upper inner-shaft head frame 37 is fixed to the end of inner shaft 15 on which the upper rotor hub 16 is mounted;

a lower inner-shaft head frame 31 that is connected with each of the lower upper-rotor steering rods 45 to support each of the lower upper-rotor steering rods 45 without affecting the rotation thereof, and one end of the lower inner-shaft head frame 31 is fixed on the inner shaft 15 and the other end is connected with the end of the sliding rod 46 of the lower-rotor tilted plate on which the rotating upper-rotor swashplate 4 is mounted.

Preferably, the lower-rotor driving system may further comprise:

at least three first gearbox bodies 5, each of which is connected with a corresponding first motor 9, wherein, rotational speed output by the corresponding first motor 9 is adjusted by each of the first gearbox bodies 5;

correspondingly, the upper-rotor driving system may further comprise at least three second gearbox bodies 43, each of which is connected with a corresponding second motor 49, wherein, rotational speed output by the corresponding second motor 49 is adjusted by each of the second gearbox bodies 43.

Preferably, the first gearbox body 5 and the second gearbox body 43 are a gear type gearbox body or a chain type gearbox body.

Preferably, the width of one end of the blade-clamp tilted arm 13 of the lower rotor that is fixed on the first blade clamping body is greater than the width of the other end of the blade-clamp tilted arm 13 of the lower rotor; the width of one end of the blade-clamp tilted arm 42 of the upper rotor that is fixed on the second blade clamping body is greater than the width of the other end of the blade-clamp tilted arm 42 of the upper rotor.

Preferably, each of the lower-rotor steering assemblies is constituted by a anti-rotation plate 21 and a lower-rotor steering rod—L arm 23, wherein, one end of the anti-rotation plate 21 is connected with one end of the lower-rotor steering rod—L arm 23 and the other end of the anti-rotation plate 21 is connected with the lower rotor hub 14, and the other end of the lower-rotor steering rod—L arm 23 is connected with the rotating lower-rotor swashplate 24.

Preferably, the first sliding block 44 penetrates into a through hole of the first anti-rotation rod 25 but does not penetrate out of this through hole;

alternatively, the first sliding block 44 penetrates into the through hole of the first anti-rotation rod 25 and penetrates out of this through hole.

Preferably, the second sliding block 30 penetrates into a through hole of the second anti-rotation rod 29 but does not penetrate out of this through hole;

alternatively, the second sliding block 30 penetrates into the through hole of the second anti-rotation rod 29 and penetrates out of this through hole.

In the solution, at least three first actuators 8 can drive a nonrotating lower-rotor swashplate 11 to tilt towards a specific direction by cooperating with each other (with first screw-rod sleeve rods 65 extending, shortening or stationary) such that a rotating lower-rotor swashplate 24, lower tilted-arm pull rods 35 and blade-clamp tilted arms 13 of the lower rotor are all in motion, thereby driving first blade clamping bodies to twist relative to a lower rotor hub 14 at least three second actuators 58 can drive a nonrotating upper-rotor swashplate 3 towards a specific direction by cooperating with each other (with second screw-rod sleeve rods 28 extending, shortening or stationary) such that a rotating upper-rotor swashplate 4, upper-rotor steering rod—L arms 47, lower upper-rotor steering rods 45, pull rods 56, upper upper-rotor steering rods 40, upper tilted-arm pull rods 41, blade-clamp tilted arms 42 of the upper rotor are all in motion, thereby driving a second blade clamping body to be twisted relative to an upper rotor hub 16. Thus, in the solution, the structure of a rotor driving system is simplified, thus solving the problems of a low production efficiency of the process and of inconvenient testing and maintenance.

BRIEF DESCRIPTION OF THE DRAWINGS

In order to describe embodiments of the present invention or technical solutions in prior art more clearly, drawings used for embodiments of the present invention or the prior art will be described briefly below. It is obvious that the drawings set forth below are for only some embodiments of the present invention, and those skilled in the art can also obtain further drawings based on these drawings without creative efforts.

DETAILED DESCRIPTION

The present invention will be further described in detail with reference to the drawings and the embodiments so as to make the objects, technical solutions and advantages of the present invention more clear and easier to understand. Obviously, the embodiments descried are only a part of embodiments of the present invention, and not all the embodiments thereof. All the other embodiments obtained by an ordinary skilled in the art without any creative effort based on the embodiments of the present invention fall into the protection scope of the present invention.

In order to simplify the structure of a rotor driving system and thus solve the problems of a low production efficiency of the process and of inconvenient testing and maintenance, the embodiments of the present invention provide a rotor driving system.

Figure 1:
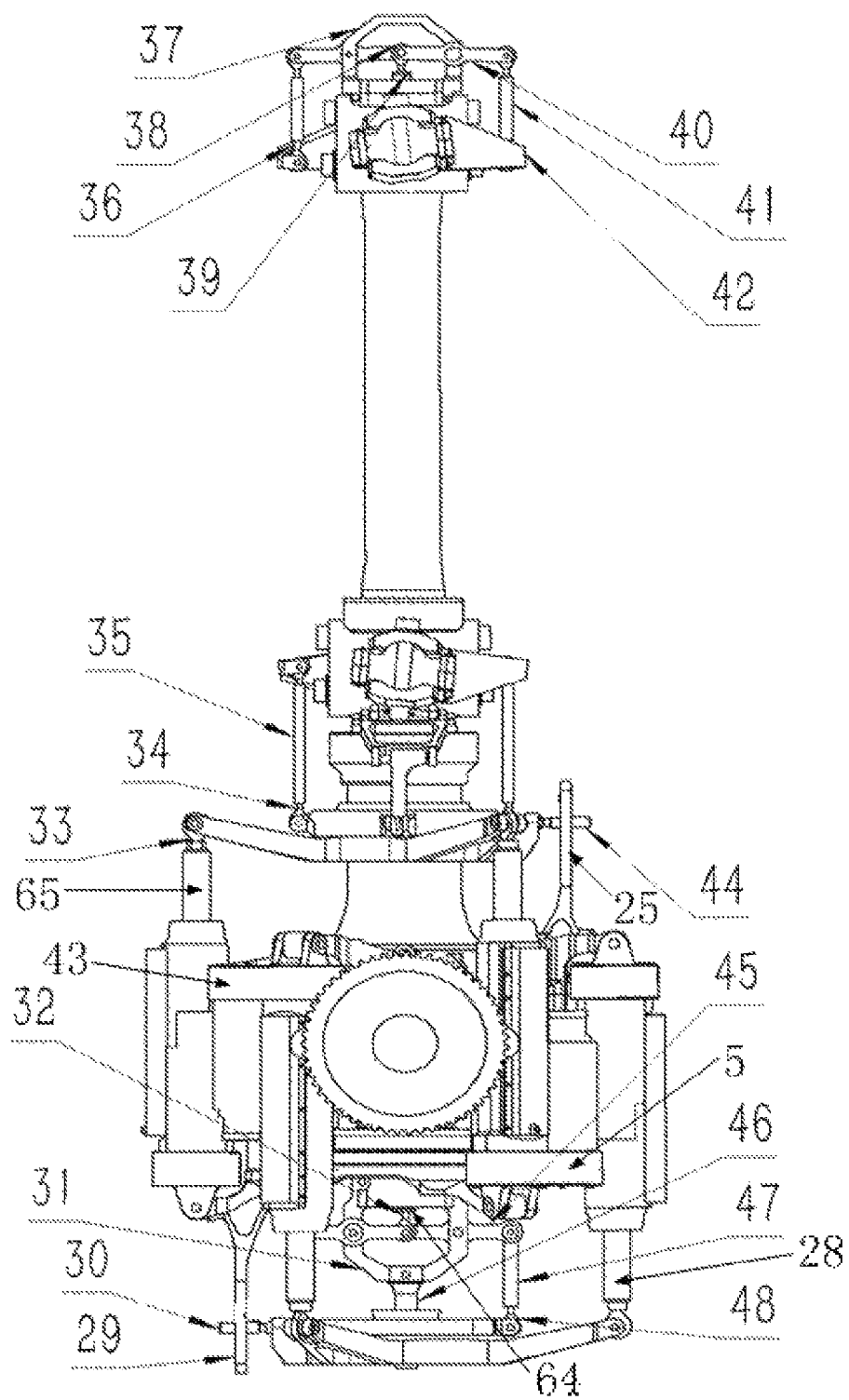
FIG. 1 is a front view of a rotor driving system provided by an embodiment of the present invention.
Figure 2:
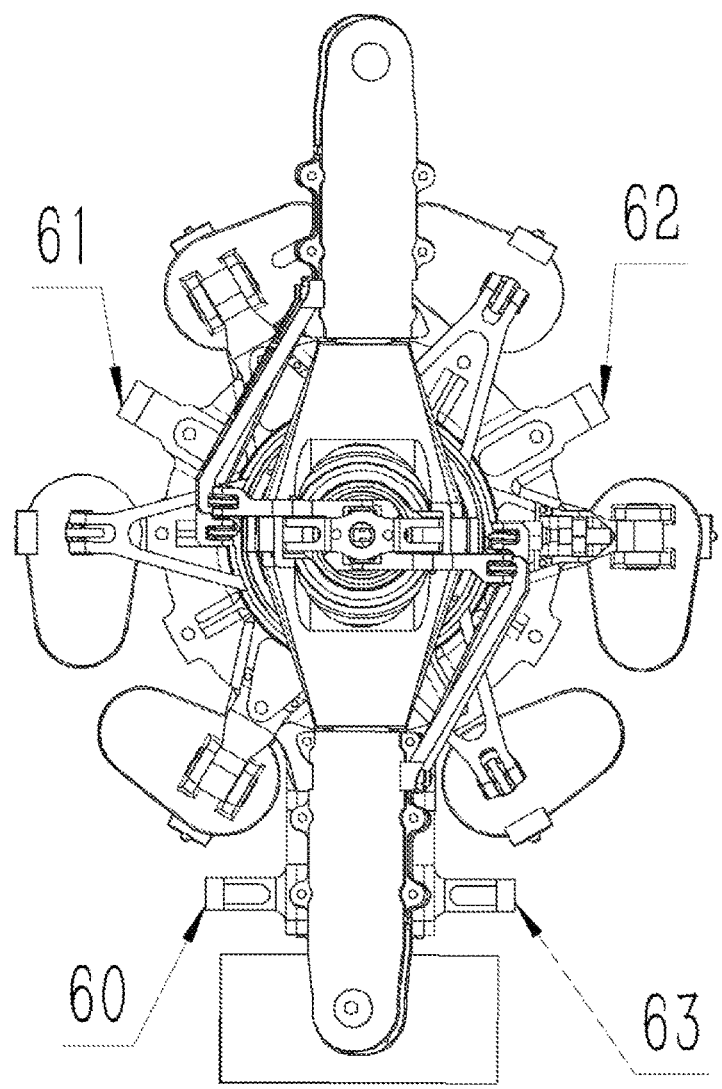
FIG. 2 is a top view of a rotor driving system provided by an embodiment of the present invention.
Figure 3:
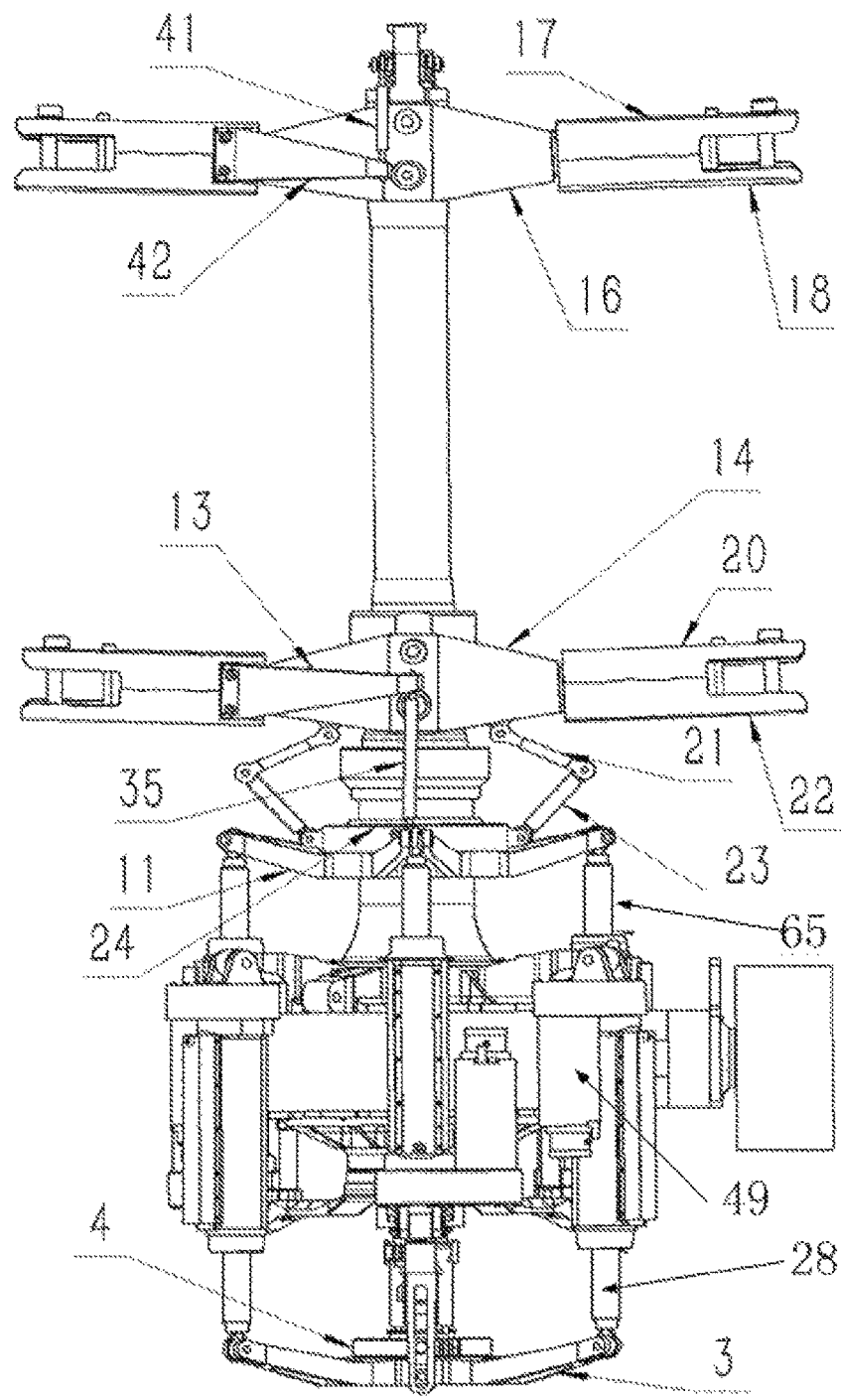
FIG. 3 is a left view of a rotor driving system provided by an embodiment of the present invention.
Figure 4:
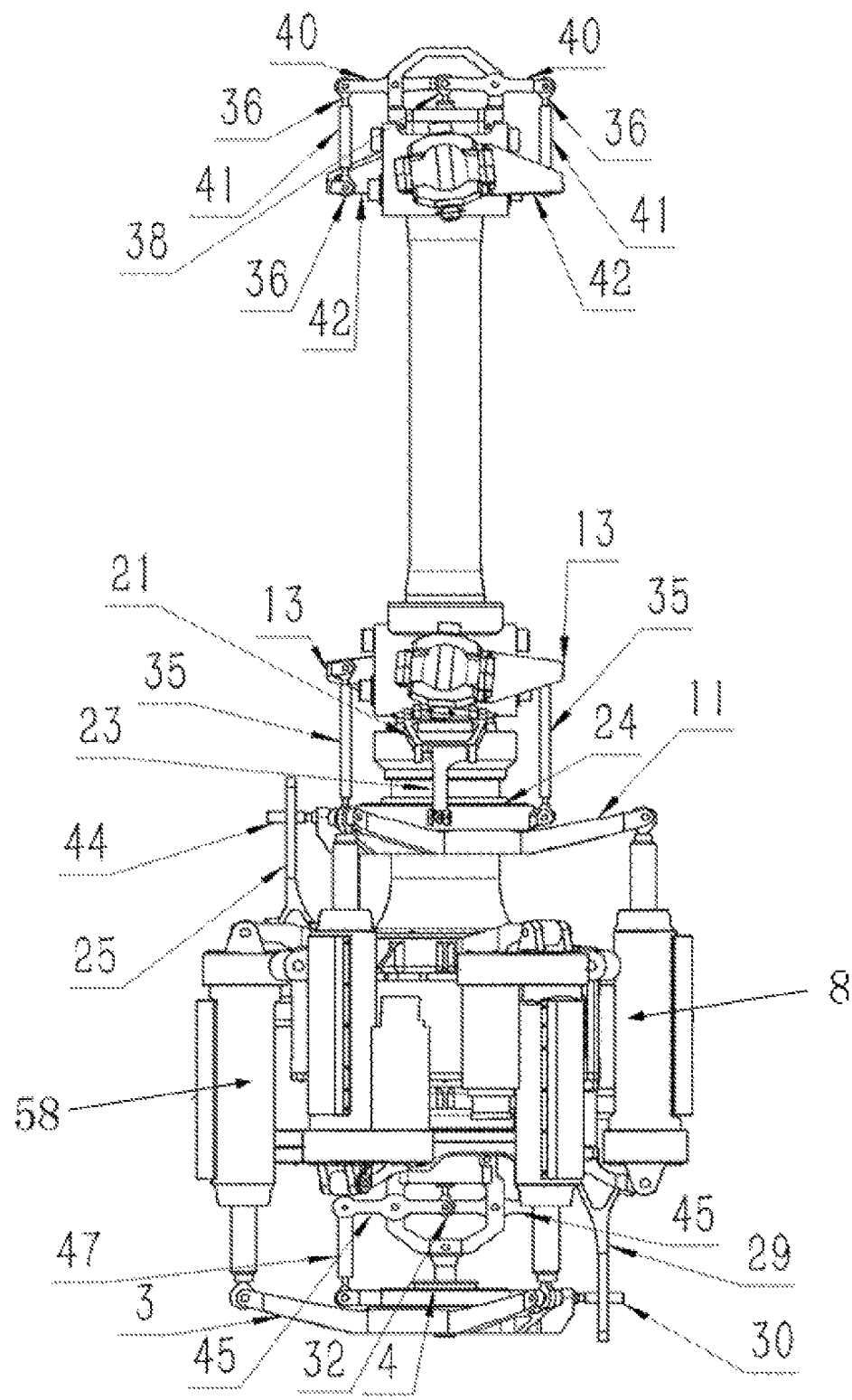
FIG. 4 is a back view of a rotor driving system provided by an embodiment of the present invention.
Figure 5:
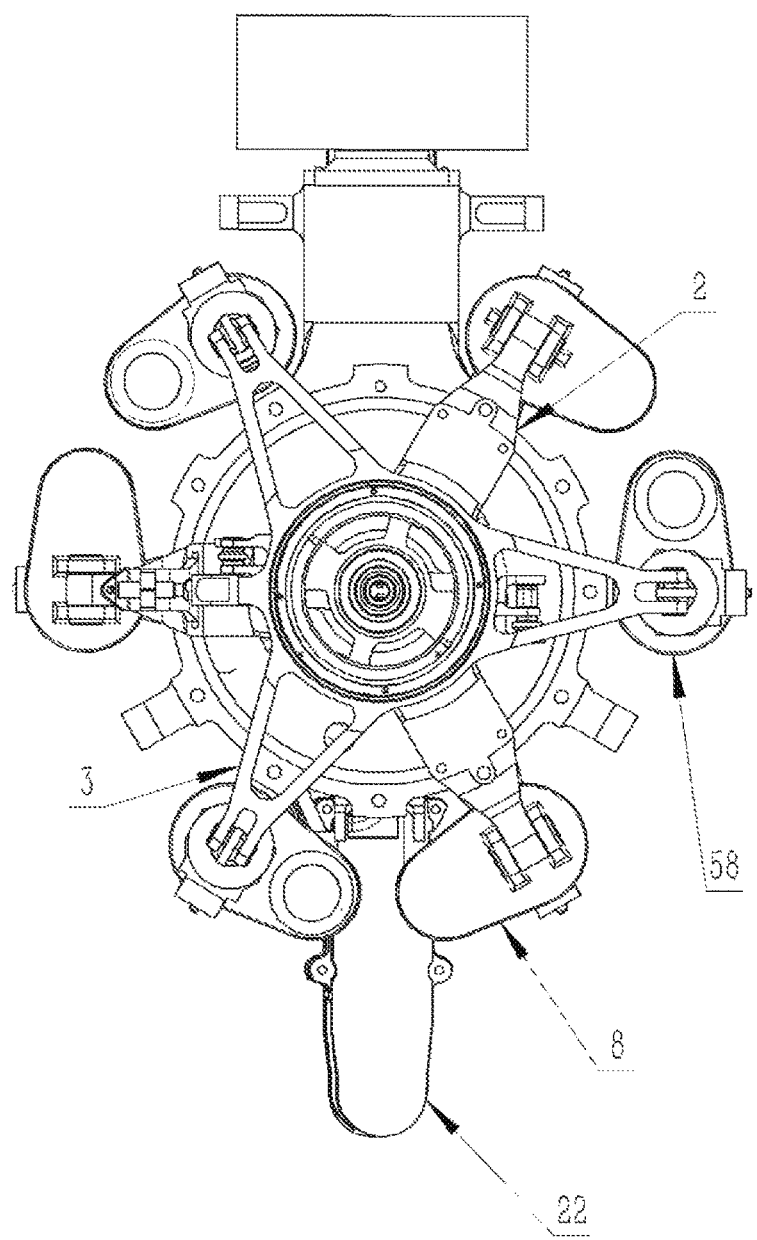
FIG. 5 is a bottom view of a rotor driving system provided by an embodiment of the present invention.
Figure 6:
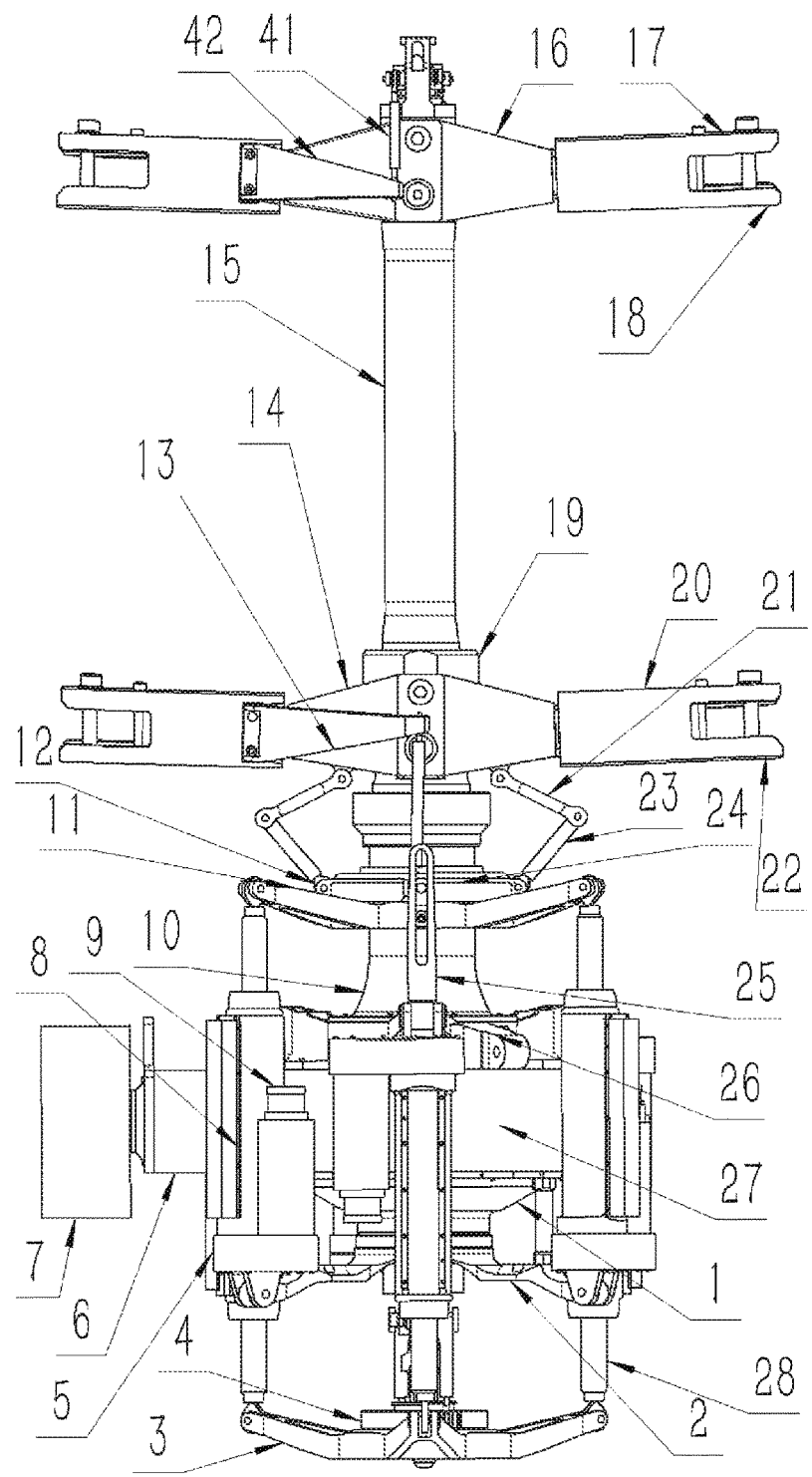
FIG. 6 is a right view of a rotor driving system provided by an embodiment of the present invention.
Figure 7:
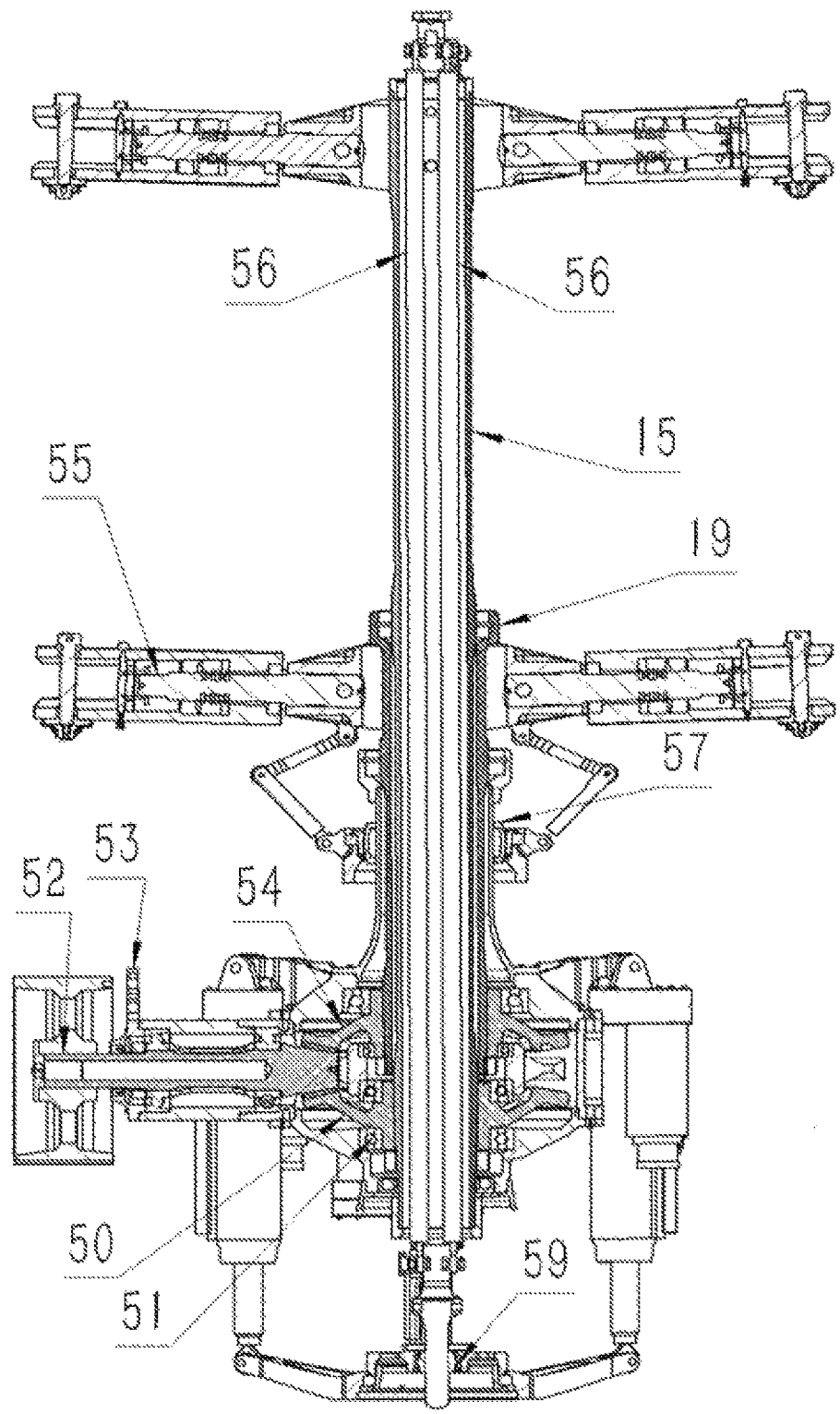
FIG. 7 is a full section view of the front view of a rotor driving system provided by an embodiment of the present invention.

The rotor driving system provided by an embodiment of the present invention will be described below with reference to FIGS. 1-7. Wherein, FIG. 1 is a front view of a rotor driving system provided by an embodiment of the present invention; FIG. 2 is a top view of a rotor driving system provided by an embodiment of the present invention; FIG. 3 is a left view of a rotor driving system provided by an embodiment of the present invention; FIG. 4 is a back view of a rotor driving system provided by an embodiment of the present invention; FIG. 5 is a bottom view of a rotor driving system provided by an embodiment of the present invention; FIG. 6 is a right view of a rotor driving system provided by an embodiment of the present invention; FIG. 7 is a full section view of the front view of the rotor driving system provided by an embodiment of the present invention with its section plane being a plane through the center line of an inner shaft and perpendicular to the paper surface and the projection is leftward.

It should be noted that the rotor driving system provided by the embodiments of the present invention is applicable to a twin-rotor coaxial autonomous helicopter. Wherein, as shown in FIGS. 1-7, the twin-rotor coaxial autonomous helicopter may comprise:

an outer shaft 19;

a lower rotor hub 14 fixed at outside of one end of the outer shaft 19;

at least two first blade clamping bodies that are connected with the lower rotor hub 14, each of the first blade clamping bodies can be twisted relative to the lower rotor hub 14 and comprises a first blade clamp 20 and a second blade clamp 22, wherein, the first blade clamp 20 and the second blade clamp 22 cooperatively clamp the lower rotor blade;

an inner shaft 15;

an upper rotor hub 16 fixed at outside of one end of the inner shaft 15, at least two second blade clamping bodies that are connected with the upper rotor hub 16, each of the second blade clamping bodies can be twisted relative to the upper rotor hub 16 and comprises a third blade clamp 17 and a forth blade clamp 18, wherein, the third blade clamp 17 and the forth blade clamp 18 cooperatively clamp the upper rotor blade;

a box, in which a gear train is housed, may comprise an upper cover 26, a box body 27 and a lower cover 1, wherein, the gear train is connected with the outer shaft 19 and the inner shaft 15;

a synchronous belt wheel 7 that is connected with the gear train, and rotation of the synchronous belt wheel drives the gear train to rotate so as to drive the outer shaft 19 and the inner shaft 15 to rotate, and wherein the outer shaft 19 rotates reversely relative to the inner shaft 15, the lower rotor hub 14 is stationary relative to the outer shaft 19 and the upper rotor hub 16 is stationary relative to the inner shaft 15.

Wherein, each of the first blade clamping bodies can be twisted relative to the lower rotor hub 14 and each of the second blade clamping bodies can be twisted relative to the upper rotor hub 16 under the action of a blade-clamp shaft, for example, a blade-clamp shaft 55 is provided within the second blade clamping body, enabling the second blade clamping body to twist relative to the upper rotor hub 16.

Further, in particular, the extension end 6 of the box body 27 is connected with the synchronous belt wheel 7 such that the synchronous belt wheel 7 can rotate smoothly under the action of an engine as a power device in the twin-rotor coaxial autonomous helicopter without being affected by other elements. And the gear train housed in the box may comprise a conical-gear shaft 52, an upper conical gear 54 and a lower conical gear 50; wherein, the synchronous belt wheel 7 is connected with the conical-gear shaft 52 which in turn is respectively connected to the upper conical gear 54 and the lower conical gear 50, and the upper conical gear 54 is engaged with the outer shaft 19 and the lower conical gear 50 is connected with the inner shaft 15. Further, a gear-shaft end cover 53 may be comprised, which is arranged on the extension end 6 of the box body 27 and severs for the axial locating of the conical-gear shaft 52.

In combination of FIGS. 1-7, a rotor driving system applicable to a twin-rotor coaxial autonomous helicopter provided by the embodiment of the present invention may comprise an upper-rotor driving system and a lower-rotor driving system;

wherein, the lower-rotor driving system may comprise:

at least two blade-clamp tilted arms 13 of the lower rotor, one end of each of which is fixed on a preset mounting surface of a corresponding first blade clamping body; wherein, each of the blade-clamp tilted arms 13 of the lower rotor uniquely corresponds to one first blade clamping body;

at least two lower tilted-arm pull rods 35, one end of each of which is connected with the other end of the corresponding blade-clamp tilted arm 13 of the lower rotor; wherein, each of the lower tilted-arm pull rods uniquely corresponds to one blade-clamp tilted arm 13 of the lower rotor;

a supporting tower 10 sleeved on the outer shaft 19 with one end fixed on the upper cover 26; wherein, the inner wall of the supporting tower 10 is spaced from the outer wall of the outer shaft 19 by a certain distance such that the supporting tower 10 does not interfere rotation of the outer shaft 19;

a rotating lower-rotor swashplate 24 that is sleeved on a nonrotating lower-rotor swashplate 11 and is connected with the other end of each of the lower tilted-arm pull rods 35; wherein, the rotating lower-rotor swashplate 24 can rotate relative to the supporting tower 10;

at least two lower-rotor steering assemblies, one end of each of which is connected with the lower rotor hub 14 and the other end is connected with the rotating lower-rotor swashplate 24 so as to drive the rotating lower-rotor swashplate 24 to rotate as the lower rotor hub 14 rotates with the outer shaft 19;

a nonrotating lower-rotor swashplate 11 that is sleeved on the supporting tower 10 via a lower-rotor joint bearing 57 and is connected with the rotating lower-rotor swashplate 24 via the lower-rotor joint bearing 57, and the rotating lower-rotor swashplate 24 and the nonrotating lower-rotor swashplate 11 can rotate independently from each other; wherein, the nonrotating lower-rotor swashplate 11 can rotate relative to the supporting tower 10;

a actuator mounting base 2 that is fixedly connected with the lower cover 1:

at least three first actuators 8 mounted on the actuator mounting base 2, each of the first actuators 8 may comprise a housing; and first screw-rod sleeve rods 65 with one end located in the housing, the first screw-rod sleeve rods 65 can be telescoped upward and downward, and the end of each first screw-rod sleeve rod 65 that protrudes out of the housing is connected with the nonrotating lower-rotor swashplate 11 so as to drive the nonrotating lower-rotor swashplate 11 to tilt towards a specific direction as the first screw-rod sleeve rod 65 is telescoped upward and downward and thus drive the rotating lower-rotor swashplate 24 to tilt towards a specific direction; wherein, the nonrotating lower-rotor swashplate 11 can tilt towards a specific direction when the extending lengths of the at least three first screw-rod sleeve rods 65 are different;

at least three first motors 9 each of which is connected with a corresponding first actuator 8 and controls the first screw-rod sleeve rod 65 of the corresponding first actuator 8 to be telescoped upward and downward;

a first anti-rotation rod 25, one end of which is fixed on a location other than the location of the supporting tower 10 on the upper cover 26 and the other end is provided with a through hole;

a first sliding block 44 that is arranged on the nonrotating lower-rotor swashplate 11 and penetrates into the through hole of the first anti-rotation rod 25 so as to ensure that the nonrotating lower-rotor swashplate 11 can tilt towards a specific direction and is not rotatable with the rotating lower-rotor swashplate 24:

wherein, the upper-rotor driving system may comprise:

at least two blade-clamp tilted arms 42 of the upper rotor, one end of each of which is fixed on the preset mounting surface of a corresponding second blade clamping body; wherein, each of the blade-clamp tilted arms 42 of the upper rotor uniquely corresponds to one second blade clamping body;

at least two upper tilted-arm pull rods 41, one end of each of which is connected with the other end of the corresponding blade-clamp tilted arm 42 of the upper rotor; wherein, each of the upper tilted-arm pull rods 41 uniquely corresponds to one blade-clamp tilted arm 42 of the upper rotor;

at least two upper upper-rotor steering rods 40, one end of each of which is connected with the corresponding upper tilted-arm pull rod 41; wherein, each of the upper upper-rotor steering rods 40 uniquely corresponds to one upper tilted-arm pull rod 41:

an upper pull-rod plug 39 that is connected with the other end of the upper upper-rotor steering rod 40;

at least two pull rods 56 which are located within the inner shaft 15 and one end of each of which is connected with a corresponding upper upper-rotor steering rod 40 by the upper pull-rod plug 39; wherein, each of the pull rods uniquely corresponds to one upper upper-rotor steering rod 40:

a lower pull-rod plug 64;

at least two lower upper-rotor steering rods 45, one end of each of which is connected with the lower pull-rod plug 64, and is connected with the other end of the corresponding pull rod 56 via the lower pull-rod plug 64; wherein, each of the lower upper-rotor steering rods 45 uniquely corresponds to one pull rod 56;

at least two upper-rotor steering rod—L arms 47, one end of each of which is connected with the other end of the corresponding lower upper-rotor steering rod 45; wherein, each of the upper upper-rotor steering rod—L arms 47 uniquely corresponds to one lower upper-rotor steering rod 45;

a sliding rod 46 of an upper-rotor swash plate;

a rotating upper-rotor swashplate 4 that is sleeved on the sliding rod 46 of an upper-rotor swash plate by an upper-rotor joint bearing 59 and is connected with the other end of the upper-rotor steering rod—L arm 47 such that the rotating upper-rotor swashplate 4 is driven to rotate under the action of the upper-rotor steering rod—L arms 47 and the lower upper-rotor steering rods 45 when the upper rotor hub 16 rotates with the inner shaft 15; wherein, the rotating upper-rotor swashplate 4 can rotate relative to the sliding rod 46 of the upper-rotor swash plate;

a nonrotating upper-rotor swashplate 3 that is sleeved on the rotating upper-rotor swashplate 4, and the rotating upper-rotor swashplate 4 and the nonrotating upper-rotor swashplate 3 can rotate independently from each other; wherein, the nonrotating upper-rotor swashplate 3 can rotate relative to the sliding rod 46 of the upper-rotor swash plate;

at least three second actuators 58 mounted on the upper cover 26, each of the second actuators 58 may comprise a housing; and a second screw-rod sleeve rod 28 with one end located in this housing, the second screw-rod sleeve rod 28 can be telescoped upward and downward, and the end of each second screw-rod sleeve rod 28 that protrudes out of the housing is connected with the nonrotating upper-rotor swashplate 3 so as to drive the nonrotating upper-rotor swashplate 3 to tilt towards a specific direction as the second screw-rod sleeve rod 28 is telescoped upward and downward and thus drive the rotating upper-rotor swashplate 4 to tilt towards a specific direction; wherein, the nonrotating upper-rotor swashplate 3 can tilt towards a specific direction when the lengths of the at least three second screw-rod sleeve rods 28 are different;

at least three second motors 49, each of which is connected with a second screw-rod sleeve rod 28 of a corresponding second actuator 58 and controls the second screw-rod sleeve rod 28 of the corresponding second actuator 58 to be telescoped upwards and downwards:

a second anti-rotation rod 29 with one end fixed on the actuator mounting base 2 and the other end is provided with a through hole;

a second sliding block 30 that is arranged on the nonrotating upper-rotor swashplate 3 and penetrates into the through hole of the second anti-rotation rod 29 such that the nonrotating upper-rotor swashplate 3 can tilt towards a specific direction and is not rotatable with the rotating upper-rotor swashplate 4.

It should be noted that the lower-rotor steering assembly can be constituted by two elements, for example, the lower-rotor steering assembly can be constituted by a anti-rotation plate 21 and a lower-rotor steering rod—L arm 23 as shown in FIGS. 3 and 6, wherein one end of the anti-rotation plate 21 is connected with one end of the lower-rotor steering rod—L arm 23 and the other end of the anti-rotation plate 21 is connected with the lower rotor hub 14, and the other end of the lower-rotor steering rod—L arm 23 is connected with the rotating lower-rotor swashplate 24. Of course, it can be understood by those skilled in the art that the lower-rotor steering assembly can also be constituted by one element, wherein one end of this element is connected with the lower rotor hub 14 and the other end is connected with the rotating lower-rotor swashplate 24; alternatively, it is also possible that the lower-rotor steering assembly can be constituted by at least three elements, by which the lower rotor hub 14 and the rotating lower-rotor swashplate 24 are connected with each other.

Here, for the length of the through hole of the first anti-rotation rod 25, it is necessary to ensure that the nonrotating lower-rotor swashplate 11 can tilt towards a specific direction smoothly; for the length of the through hole of the second anti-rotation rod 29, it is necessary to ensure that the nonrotating upper-rotor swashplate 3 can tilt towards a specific direction smoothly.

Here, the lengths of the first sliding block 44 and the second sliding block 30 can be set according to the actual situations. For example, the first sliding block 44 may penetrate into the through hole of the first anti-rotation rod 25 but do not penetrate out of the through hole; alternatively, it is also possible that the first sliding block 44 may penetrate into and out of the through hole of the first anti-rotation rod 25; and the second sliding block 30 can penetrate into the through hole of the second anti-rotation rod 29 but do not penetrate out of the through hole; alternatively, it is also possible that the second sliding block 30 can penetrate into and out of the through hole of the second anti-rotation rod 29.

Also, the connections between the elements described in the embodiments of the present invention can utilize, but is not limited to, a bearing connection or a threaded connection according to the actual application requirements. For example, the connection between the nonrotating lower-rotor swashplate 11 and the rotating lower-rotor swashplate 24 and the connection between the nonrotating upper-rotor swashplate 3 and the rotating upper-rotor swashplate 4 can both utilize a bearing connection; the lower-rotor steering assembly can be connected with a bearing seat 12 of L-arm rod end that is connected to the rotating lower-rotor swashplate 24 and thus enabling the connection with the rotating lower-rotor swashplate 24; the lower upper-rotor steering rod 45 can be connected with the lower pull-rod plug 64 by a lower pull-rod joint bearing 32; the upper tilted-arm pull rod 41 can be connected to a bearing seat 36 of tilted-arm upper rod end that is connected to a blade-clamp tilted arm 42 of the upper rotor, thus enabling the connection with the blade-clamp tilted arm 42 of the upper rotor; the upper pull-rod plug 39 can be connected to a bearing seat 38 of an pull rod upper joint that is connected to the upper upper-rotor steering rod 40, thus enabling the connection with the upper upper-rotor steering rod 40; the first screw-rod outer sleeve rod 65 can be connected with a nonrotating lower-rotor swashplate 11 by a rod-end bearing seat 33; the lower tilted-arm pull rod 35 can be connected with a rotating lower-rotor swashplate 24 by a bearing seat 34 of tilted-arm lower rod-end; similarly, a lower joint bearing 48, the lower-rotor joint bearing 57, the upper-rotor joint bearing 59 and a bearing 51 also may serve as the connection parts between corresponding elements.

It should be noted that the rotor driving system provided by the embodiments of the present invention can be connected with the frame of a twin-rotor coaxial autonomous helicopter by a first connection point 60, a second connection point 61, a third connection point 62 and a fourth connection point 63. Of course the present invention is not limited to this.

In the solution, at least three first actuators 8 can drive a nonrotating lower-rotor swashplate 11 to tilt towards a specific direction by cooperating with each other (with first screw-rod sleeve rods 65 extending, shortening or stationary) such that a rotating lower-rotor swashplate 24, lower tilted-arm pull rods 35 and blade-clamp tilted arms 13 of the lower rotor are all in motion, thereby driving first blade clamping bodies to be twisted relative to a lower rotor hub 14; at least three second actuators 58 can cause a nonrotating upper-rotor swashplate 3 to tilt towards a specific direction by cooperating with each other (with second screw-rod sleeve rods 28 extending, shortening or stationary) such that a rotating upper-rotor swashplate 4, upper-rotor steering rod—L arms 47, lower upper-rotor steering rods 45, pull rods 56, upper upper-rotor steering rods 40, upper tilted-arm pull rods 41, blade-clamp tilted arms 42 of the upper rotor are all in motion, thereby driving a second blade clamping body to be twisted relative to an upper rotor hub 16. Thus, in the solution, the structure of a rotor driving system is simplified, which can solve the problems of a low production efficiency of the process and of inconvenient testing and maintenance.

Further, in order to achieve a stable structure, the upper-rotor driving system may include:

an upper inner-shaft head frame 37, which is connected with each of the upper upper-rotor steering rods 40 to support each of the upper upper-rotor steering rods 40 without affecting the rotation thereof, one end of the upper inner-shaft head frame 37 is fixed to the end of inner shaft 15 on which the upper rotor hub 16 is mounted;

a lower inner-shaft head frame 31, which is connected with each of the lower upper-rotor steering rods 45 to support each of the lower upper-rotor steering rods 45 without affecting the rotation thereof, one end of the lower inner-shaft head frame 31 is fixed on the inner shaft 15, and the other end is connected with the end of a sliding rod 46 of the lower-rotor tilted plate on which the rotating upper-rotor swashplate 4 is mounted.

It can be seen that shake caused when the upper upper-rotor steering rods 40 and the upper tilted-arm pull rods 41 rotate with the inner shaft 15 can be avoided by adding the upper inner-shaft head frame 37, and thus improving the structural stability; and the shake caused when the lower upper-rotor steering rods 45 rotate with the inner shaft 15 can be avoided by adding the lower inner-shaft head frame 31, and thus improving the structural stability.

Further, the lower-rotor driving system may further comprise:

at least three first gearbox bodies 5, each of which is connected with a corresponding first motor 9, wherein, the rotational speed output by the corresponding first motor 9 is adjusted by each of the first gearbox bodies 5.

Correspondingly, the upper-rotor driving system may further comprise:

at least three second gearbox bodies 43, each of which is connected with a corresponding second motor 49, wherein, the rotational speed output by the corresponding second motor 49 is adjusted by each of the second gearbox bodies 43. It can be understood by those skilled in the art that the first gearbox body 5 and the second gearbox body 43 may be, but not be limited to, a gear type gearbox body or a chain type gearbox body.

It can be seen that the selectivity of the first motor 9 is improved by providing a first gearbox body 5 for the first motor 9; and the selectivity of the second motor 49 is improved by providing a second gearbox body 43 for the second motor 49.

Further, the width of one end of the blade-clamp tilted arm 13 of the lower rotor that is fixed on the first blade clamping body may be greater than the width of the other end of the blade-clamp tilted arm 13 of the lower rotor; the width of one end of the blade-clamp tilted arm 42 of the upper rotor that is fixed on the second blade clamping body may be greater than the width of the other end the blade-clamp tilted arm 42 of the upper rotor, wherein, the difference in widths is intended to make the blade-clamp tilted arms 13 of the lower rotor and the blade-clamp tilted arms 42 of the upper rotor to achieve the same strength so as to reduce the mass of the blade-clamp tilted arms 13 of the lower rotor and the blade-clamp tilted arms 42 of the upper rotor.

Further, a method for driving a rotor corresponding to the rotor driving system described above may comprise:

step a: a command for flight control is received;

wherein, a command for flight control can be sent by an operator through an operation interface when it is needed to drive a rotor system, a flight control device on the frame of a coaxial autonomous helicopter will receive the command for flight control and perform the subsequent processes according to the received command for flight control.

It can be understood by those skilled in the art that the command for flight control can be a takeoff command, a hover command, a forward command, a reverse command, a left steering command or a right steering command. It is possible that the command for flight control can be sent by a remote controller, alternatively the command for flight control can be sent by a ground control station.

Step b: current rotational states of first motors 9 corresponding to at least three first actuators 8 in the lower-rotor driving system and current rotational states of second motors 49 corresponding to at least three second actuators 58 in the upper-rotor driving system are obtained;

After receiving a command for flight control, the flight control device can obtain the current rotational states of first motors 9 corresponding to at least three first actuators 8 in the lower-rotor driving system and the current rotational states of second motors 49 corresponding to at least three second actuators 58 in the upper-rotor driving system, and thus subsequent processes can be carried out. Further, each of the first actuators 8 uniquely corresponds to one first motor 9, each of the second actuators 58 uniquely corresponds to one second motor 49, and each of the first motors 9 uniquely corresponds to one current rotational state, each of the second motors 49 uniquely corresponds to one current rotational state.

It can be understood by those skilled in the art that the rotational state of a motor can be the angle by which the motor rotates.

Step c: required first rotational states of the first motors 9 are determined according to the command for flight control and the current rotational states of the first motors 9;

the required first rotational states of the first motors 9 can be determined after obtaining the command for flight control and the current rotational states of the first motors 9, and the first motors 9 are subsequently controlled according to the first rotational states, wherein, each of the first motors 9 uniquely corresponds to one first rotational state. The required first rotational states of various first motors 9 can be the same or different.

Step d: required second rotational states of the second motors 49 are determined according to the command for flight control and the current rotational states of the second motors 49;

the required second rotational states of the second motors 49 can be determined after obtaining the command for flight control and the current rotational states of the second motors 49, and the second motors 49 are subsequently controlled according to the second rotational states. Wherein, each of the second motors 49 uniquely corresponds to one second rotational state. The required second rotational states of various second motors 49 can be the same or different.

Step e: the first motor 9 is controlled to rotate in a corresponding first rotational state such that a first screw-rod outer sleeve rod 65 of each of the first actuators 8 extends, shortens or remains stationary with rotation of the corresponding first motor 9:

wherein, the first screw-rod outer sleeve rod 65 of each of the first actuators 8 extends, shortens or remains stationary with rotation of the corresponding first motor 9, which can drive a nonrotating lower-rotor swashplate 11 in the lower-rotor driving system to tilt towards a specific direction and thus drive the rotating lower-rotor swashplate 24, the at least two lower tilted-arm pull rods 35 and the at least two blade-clamp tilted arms 13 of the lower rotor to move, thus enabling the first blade clamping bodies to be twisted relative to the lower rotor hub 14.

It should be noted that the first screw-rod outer sleeve rod 65 of the first motor 8 will remain stationary (i.e., neither extends nor shortens) with rotation of the corresponding first motor 9 when the first rotational state of the first motor 9 and the current rotational state thereof are the same; and the first screw-rod outer sleeve rod 65 of the first motor 8 will extend or shorten with rotation of the corresponding first motor 9 when the first rotational state of the first motor 9 and the current rotational state thereof are different:

Step f: the second motor 49 is controlled to rotate in a corresponding second rotational state such that a second screw-rod outer sleeve rod 28 of each of the second actuators 58 extends, shortens or remains stationary with rotation of the corresponding second motor 49.

Wherein, the second screw-rod outer sleeve rod 28 of each of the second actuators 58 extends, shortens or remains stationary with rotation of the corresponding second motor 49 which can drive a nonrotating upper-rotor swashplate 3 in the upper-rotor driving system to tilt towards a specific direction and thus drive the rotating upper-rotor swashplate 4, the at least two upper-rotor steering rods—L arms 47, the at least two lower upper-rotor steering rods 45, the at least two pull rods 56 within the inner shaft 15, the at least two upper upper-rotor steering rods 40, the at least two upper tilted-arm pull rods 41 and at least two blade-clamp tilted arms 42 of the upper rotor to move, thus enabling the second blade clamping bodies to be twisted relative to the upper rotor hub 16.

It should be noted that the second screw-rod outer sleeve rod 28 of the second motor 58 will remain stationary (i.e., neither extends nor shortens) with rotation of the corresponding second actuator 58 when the second rotational state of the second motor 58 and the current rotational state thereof are the same; and the second screw-rod outer sleeve rod 28 of the second motor 58 will extend or shorten with rotation of the corresponding second actuator 58 when the second rotational state of the second motor 58 and the current rotational state thereof are different.

Wherein, rotation of the lower rotor hub 14 with the outer shaft 19 drives the rotating lower-rotor swashplate 24 to rotate under the action of the at least two lower-rotor steering assemblies in the lower-rotor driving system; rotation of the upper rotor hub 16 with the inner shaft 15 drives the rotating upper-rotor swashplate 4 to rotate under the action of the upper-rotor steering rods—L arms 47 and the lower upper-rotor steering rods 45.

The nonrotating lower-rotor swashplate 11 is not rotatable with the rotating lower-rotor swashplate 24 under the action of the first anti-rotation rod 25 and the first sliding block 44 in the lower rotor driving system; the nonrotating upper-rotor swashplate 3 is not rotatable with the rotating upper-rotor swashplate 4 under the action of the second anti-rotation rod 29 and the second sliding block 30 in the upper-rotor driving system.

In particular, the step of determining the required first rotational states of the first motors 9 according to the command for flight control and the current rotational states of the first motors 9 may comprise:

(1) the current twist angle by which each of the first blade clamping bodies rotates relative to the lower rotor hub 14 is determined according to the current rotational states of the first motors 9;

wherein, each of the first blade clamping bodies uniquely corresponds to one current twist angle.

It can be understood by those skilled in the art that it is possible to determine the current twist angle by which each of the first blade clamping bodies rotates relative to the lower rotor hub 14 according to a pre-built corresponding relationship between twist angle by which each of the first blade clamping bodies rotates relative to the lower rotor hub 14 and the rotational states of the first motors 9 after determining the current rotational states of the first motors 9. Wherein, the corresponding relationship between the twist angle by which each of the first blade clamping bodies rotates relative to the lower rotor hub 14 and the rotational states of the first motors 9 can be obtained by calculation.

Wherein, the current twist angles by which the various first blade clamping bodies rotate relative to the lower rotor hub 14 can be the same or different.

(2) the required first twist angle by which each of the first blade clamping bodies rotates relative to the lower rotor hub 14 is determined according to the command for flight control and the current twist angle by which each of the first blade clamping bodies rotates relative to the lower rotor hub 14;

wherein, each of the first blade clamping bodies uniquely corresponds to the first current twist angle.

It is possible to obtain the required first twist angle by which each of the first blade clamping bodies rotates relative to the lower rotor hub 14 by the combination of the obtained command for flight control and the obtained current twist angle by which each of the first blade clamping bodies rotates relative to the lower rotor hub 14, and then to carry out the subsequent processes.

Wherein, the first twist angles by which various first blade clamping bodies rotate relative to the lower rotor hub 14 can be the same or different.

(3) the required first rotational state of each of the first motors 9 is determined according to the required first twist angle by which each of the first blade clamping bodies rotates relative to the lower rotor hub 14.

The required first rotational state of each of the first motors 9 can be determined according to a pre-built corresponding relationship between the twist angle by which each of the first blade clamping bodies rotates relative to the lower rotor hub 14 and the rotational states of the first motors 9 after determining the required first twist angle by which each of the first blade clamping bodies rotates relative to the lower rotor hub 14. Wherein, the required first rotational states of various first motors 9 can be the same or different.

Correspondingly, the step of determining the required second rotational states of the second motors 49 according to the command for flight control and the current rotational states of the second motors 10 may comprise:

(1) the current twist angle by which each of the second blade clamping bodies rotates relative to the upper rotor hub 16 is determined according to the current rotational states of the second motors 49;

wherein, each of the second blade clamping bodies uniquely corresponds to one current twist angle.

It can be understood by those skilled in the art that it is possible to determine the current twist angle by which each of the second blade clamping bodies rotates relative to the upper rotor hub 16 according to a pre-built corresponding relationship between the twist angle by which each of the second blade clamping bodies rotates relative to the upper rotor hub 16 and the rotational states of the second motors 49 after determining the current rotational states of the second motors 49. Wherein, the corresponding relationship between the twist angle by which each of the second blade clamping bodies rotates relative to the upper rotor hub 16 and the rotational states of the second motors 49 can be obtained by calculation.

Wherein, the current twist angles by which the various second blade clamping bodies rotate relative to the lower rotor hub 16 can be the same or different.

(2) the required second twist angle by which each of the second blade clamping bodies rotate relative to the upper rotor hub 16 is determined according to the command for flight control and the required current twist angle by which each of the second blade clamping bodies rotates relative to the upper rotor blade 16;

wherein, each of the second blade clamping bodies uniquely corresponds to the second twist angle.

It is possible to obtain the required second twist angle by which each of the second blade clamping bodies rotates relative to the upper rotor hub 16 by the combination of the obtained command for flight control and the obtained current twist angle by which each of the second blade clamping bodies rotates relative to the upper rotor blade 16, and then to carry out the subsequent processes.

Wherein, the second twist angles by which various second blade clamping bodies rotate relative to the lower rotor hub 16 can be the same or different.

(3) the required second rotational state of each of the second motors 49 is determined according to the required second twist angle by which each of the second blade clamping bodies rotates relative to the upper rotor hub 16.

The required second rotational state of each of the second motors 49 can be determined according to the pre-established corresponding relationship between the twist angle by which each of the second blade clamping bodies rotates relative to the upper rotor hub 16 and the rotational states of the second motors 49 after the required second twist angle by which each of the second blade clamping bodies rotates relative to the upper rotor hub 16. Wherein, the second rotational states of various second motors 49 can be the same or different.

It can be seen that the rotor driving method provided by the embodiments of the present invention enables to control the telescopic ability of the screw-rod sleeve rod in the actuator connected with the rotor such that various elements between the screw-rod sleeve rod and a blade clamping body can interact so as to drive the blade clamping body to be twisted relative to the hub, thus reducing the complexity of the rotor driving process and solving the drawback of complex driving process present in the existing rotor driving method of rotor driving system.

The above description is only the preferred embodiments of the present invention and is not intended to limit the present invention, and any modification, equivalent substitution and improvement etc. made within the spirit and principle of the present invention falls into the protection scope of the present invention.

What is claimed is:

1. A rotor driving system, which is applicable to a twin-rotor coaxial autonomous helicopter, characterized in that the twin-rotor coaxial autonomous helicopter comprises:
   an outer shaft (19);
   a lower rotor hub (14) fixed at outside of one end of the outer shaft (19);
   at least two first blade clamping bodies that are connected with the lower rotor hub (14), each of the first blade clamping bodies is twistable relative to the lower rotor hub (14) and comprises a first blade clamp (20) and a second blade clamp (22), wherein, the first blade clamp (20) and the second blade clamp (22) cooperatively clamp a lower rotor blade;
   an inner shaft (15);
   an upper rotor hub (16) fixed at outside of one end of the inner shaft (15);
   at least two second blade clamping bodies that are connected with the upper rotor hub (16), each of the second blade clamping bodies is twistable relative to the upper rotor hub (16) and comprises a third blade clamp (17) and a fourth blade clamp (18), wherein, the third blade clamp (17) and the fourth blade clamp (18) cooperatively clamp an upper rotor blade;
   a box, in which a gear train is housed, comprising an upper cover (26), a box body (27) and a lower cover (1), wherein, the gear train is connected with the outer shaft (19) and the inner shaft (15);
   a synchronous belt wheel (7) that is connected with the gear train, wherein rotation of the synchronous belt wheel (7) drives the gear train to rotate so as to drive the outer shaft (19) and the inner shaft (15) to rotate, and wherein the outer shaft (19) rotates reversely relative to the inner shaft (15), the lower rotor hub (14) is stationary relative to the outer shaft (19) and the upper rotor hub (16) is stationary relative to the inner shaft (15);
   the rotor driving system comprises an upper-rotor driving system and a lower-rotor driving system;
   wherein, the lower-rotor driving system comprises:
   at least two blade-clamp tilted arms (13) of a lower rotor, one end of each of which is fixed on a preset mounting surface of a corresponding first blade clamping body;
   at least two lower tilted-arm pull rods (35), one end of each of which is connected with the other end of the corresponding blade-clamp tilted arm (13) of the lower rotor;
   a supporting tower (10), which is sleeved on the outer shaft (19), with one end fixed on the upper cover (26);
   a rotating lower-rotor swashplate (24) that is sleeved on a nonrotating lower-rotor swashplate (11) and is connected with the other end of each of the lower tilted-arm pull rods (35);
   at least two lower-rotor steering assemblies, one end of each of which is connected with the lower rotor hub (14) and the other end is connected with the rotating lower-rotor swashplate (24) so as to drive the rotating lower-rotor swashplate (24) to rotate as the lower rotor hub (14) rotates with the outer shaft (19);
   the nonrotating lower-rotor swashplate (11) is sleeved on the supporting tower (10) via a lower-rotor joint bearing (57) and is connected with the rotating lower-rotor swashplate (24) via the lower-rotor joint bearing (57), and the rotating lower-rotor swashplate (24) and the nonrotating lower-rotor swashplate (11) are able to rotate independently from each other;
   an actuator mounting base (2) that is fixedly connected with the lower cover (1);
   at least three first actuators (8) mounted on the actuator mounting base (2), each of the first actuators (8) comprises a housing; and a first screw-rod sleeve rod (65) with one end located in the housing, the first screw-rod sleeve rod (65) is able to be telescoped upwards and downwards, and the end of each first screw-rod sleeve rod (65) that protrudes out of the housing is connected with the nonrotating lower-rotor swashplate (11) so as to drive the nonrotating lower-rotor swashplate (11) to tilt towards a specific direction as the first screw-rod sleeve rod (65) is telescoped upward and downward and thus drive the rotating lower-rotor swashplate (24) to tilt towards a specific direction;
   at least three first motors (9), each of which is connected with a corresponding first actuator (8) and controls the first screw-rod sleeve rod (65) of the corresponding first actuator (8) to be telescoped upward and downward;
   a first anti-rotation rod (25), one end of which is fixed on a location other than the location of the supporting tower (10) on the upper cover (26) and the other end is provided with a through hole;

a first sliding block (44) that is arranged on the nonrotating lower-rotor swashplate (11) and penetrates into the through hole of the first anti-rotation rod (25) so as to ensure that the nonrotating lower-rotor swashplate (11) is able to tilt towards a specific direction and is not rotatable with the rotating lower-rotor swashplate (24);

wherein, the upper-rotor driving system comprises:

at least two blade-clamp tilted arms (42) of the upper rotor, one end of each of which is fixed on a preset mounting surface of a corresponding second blade clamping body;

at least two upper tilted-arm pull rods (41), one end of each of which is connected with the other end of the corresponding blade-clamp tilted arm (42) of the upper rotor;

at least two upper upper-rotor steering rods (40), one end of each of which is connected with the other end of the corresponding upper tilted-arm pull rod (41);

an upper pull-rod plug (39) that is connected with the other end of each of the upper upper-rotor steering rods (40);

at least two pull rods (56) located within the inner shaft (15), one end of each of which is connected with a corresponding upper upper-rotor steering rod (40) by the upper pull-rod plug (39);

a lower pull-rod plug (64);

at least two lower upper-rotor steering rods (45), one end of each of which is connected with the lower pull-rod plug (64) and is connected with the other end of the corresponding pull rod (56) via the lower pull-rod plug (64);

at least two upper-rotor steering rod—L arms (47), one end of each of the upper upper-rotor steering rod—L arms (47) is connected with the other end of the corresponding lower upper-rotor steering rod (45);

a sliding rod (46) of an upper-rotor swashplate assembly, the upper-rotor swashplate assembly comprises a rotating upper-rotor swashplate (4) and a nonrotating upper-rotor swashplate (3);

the rotating upper-rotor swashplate (4) is sleeved on the sliding rod (46) of the upper-rotor swashplate assembly by an upper-rotor joint bearing (59) and is connected with the other end of the upper-rotor steering rod—L arm (47) such that the rotating upper-rotor swashplate (4) is driven to rotate under the action of the upper-rotor steering rod—L arms (47) and the lower upper-rotor steering rod (45) when the upper rotor hub (16) rotates with the inner shaft (15);

the nonrotating upper-rotor swashplate (3) is sleeved on the rotating upper-rotor swashplate (4), and the rotating upper-rotor swashplate (4) and the nonrotating upper-rotor swashplate (3) are able to rotate independently from each other;

at least three second actuators (58) mounted on the upper cover (26), each of the second actuators (58) comprises a housing; and a second screw-rod sleeve rod (28) with one end located in the housing, the second screw-rod sleeve rod (28) is able to be telescoped upward and downward and the end of each second screw-rod sleeve rod (28) that protrudes out of the housing is connected with the nonrotating upper-rotor swashplate (3) so as to drive the nonrotating upper-rotor swashplate (3) to tilt towards a specific direction as the second screw-rod sleeve rod (28) is telescoped upwards and downwards and thus drive the rotating upper-rotor swashplate (4) to tilt towards a specific direction;

at least three second motors (49), each of which is connected with a second screw-rod sleeve rod (28) of a corresponding second actuator (58) and controls the second screw-rod sleeve rod (28) of the corresponding second actuator (58) to be telescoped upward and downward;

a second anti-rotation rod (29), one end of which is fixed on the actuator mounting base (2) and the other end is provided with a through hole;

a second sliding block (30) that is arranged on the nonrotating upper-rotor swashplate (3) and penetrates into the through hole of the second anti-rotation rod (29) such that the nonrotating upper-rotor swashplate (3) is able to tilt towards a specific direction and is not rotatable with the rotating upper-rotor swashplate (4).

2. The system according to claim 1, characterized in that the upper-rotor driving system further comprises:

an upper inner-shaft head frame (37) that is connected with each of the upper upper-rotor steering rods (40) to support each of the upper upper-rotor steering rods (40) without affecting the rotation thereof, and wherein one end of the upper inner-shaft head frame (37) is fixed to the end of inner shaft (15) on which the upper rotor hub (16) is mounted;

a lower inner-shaft head frame (31) that is connected with each of the lower upper-rotor steering rods (45) to support each of the lower upper-rotor steering rods (45) without affecting the rotation thereof, and wherein one end of the lower inner-shaft head frame (31) is fixed on the inner shaft (15) and the other end is connected with the end of the sliding rod (46) of the lower-rotor tilted plate on which the rotating upper-rotor swashplate (4) is mounted.

3. The system according to claim 2, characterized in that the lower-rotor driving system further comprises:

at least three first gearbox bodies (5), each of which is connected with a corresponding first motor (9), wherein, rotational speed output by the corresponding first motor (9) is adjusted by each of the first gearbox bodies (5);

correspondingly, the upper-rotor driving system further comprises at least three second gearbox bodies (43), each of which is connected with a corresponding second motor (49), wherein, rotational speed output by the corresponding second motor (49) is adjusted by each of the second gearbox bodies (43).

4. The system according to claim 3, characterized in that each of the first gear box bodies (5) and each of the second gearbox bodies (43) is a gear type gearbox body or a chain type gearbox body.

5. The system according to claim 2, characterized in that the width of one end of the blade-clamp tilted arm (13) of the lower rotor that is fixed on the first blade clamping body is greater than the width of the other end of the blade-clamp tilted arm (13) of the lower rotor; the width of one end of the blade-clamp tilted arm (42) of the upper rotor that is fixed on the second blade clamping body is greater than the width of the other end of the blade-clamp tilted arm (42) of the upper rotor.

6. The system according to claim 2, characterized in that each of the lower-rotor steering assemblies is constituted by an anti-rotation plate (21) and a lower-rotor steering rod—L arm (23), wherein, one end of the anti-rotation plate (21) is connected with one end of the lower-rotor steering rod—L arm (23), the other end of the anti-rotation plate (21) is connected with the lower rotor hub (14), and the other end of the lower-rotor steering rod—L arm (23) is connected with the rotating lower-rotor swashplate (24).

7. The system according to claim 2, characterized in that the first sliding block (44) penetrates into, but not out of, the through hole of the first anti-rotation rod (25);
or, the first sliding block (44) penetrates into the through hole of the first anti-rotation rod (25) and out of the through hole.

8. The system according to claim 2, characterized in that the second sliding block (30) penetrates into, but not out of, the through hole of the second anti-rotation rod (29);
or, the second sliding block (30) penetrates into the through hole of the second anti-rotation rod (29) and out of the through hole.

9. The system according to claim 1, characterized in that the lower-rotor driving system further comprises:
at least three first gearbox bodies (5), each of which is connected with a corresponding first motor (9), wherein, rotational speed output by the corresponding first motor (9) is adjusted by each of the first gearbox bodies (5);
correspondingly, the upper-rotor driving system further comprises at least three second gearbox bodies (43), each of which is connected with a corresponding second motor (49), wherein, rotational speed output by the corresponding second motor (49) is adjusted by each of the second gearbox bodies (43).

10. The system according to claim 9, characterized in that each of the first gear box bodies (5) and each of the second gearbox bodies (43) is a gear type gearbox body or a chain type gearbox body.

11. The system according to claim 1, characterized in that the width of one end of the blade-clamp tilted arm (13) of the lower rotor that is fixed on the first blade clamping body is greater than the width of the other end of the blade-clamp tilted arm (13) of the lower rotor; the width of one end of the blade-clamp tilted arm (42) of the upper rotor that is fixed on the second blade clamping body is greater than the width of the other end of the blade-clamp tilted arm (42) of the upper rotor.

12. The system according to claim 1, characterized in that each of the lower-rotor steering assemblies is constituted by an anti-rotation plate (21) and a lower-rotor steering rod—L arm (23), wherein, one end of the anti-rotation plate (21) is connected with one end of the lower-rotor steering rod—L arm (23), the other end of the anti-rotation plate (21) is connected with the lower rotor hub (14), and the other end of the lower-rotor steering rod—L arm (23) is connected with the rotating lower-rotor swashplate (24).

13. The system according to claim 1, characterized in that the first sliding block (44) penetrates into, but not out of, the through hole of the first anti-rotation rod (25);
or, the first sliding block (44) penetrates into the through hole of the first anti-rotation rod (25) and out of the through hole.

14. The system according to claim 1, characterized in that the second sliding block (30) penetrates into, but not out of, the through hole of the second anti-rotation rod (29);
or, the second sliding block (30) penetrates into the through hole of the second anti-rotation rod (29) and out of the through hole.

* * * * *